United States Patent [19]

Alvarez

[11] 4,384,184
[45] May 17, 1983

[54] EXPLOSION-PROOF DEVICE FOR MEASURING LIQUID LEVELS

[75] Inventor: Fernando D. Q. Alvarez, Monclova, Mexico

[73] Assignee: Consejo Nacional de Ciencia y Technologia of Mexico, Mexico

[21] Appl. No.: 303,391

[22] Filed: Sep. 18, 1981

Related U.S. Application Data

[63] Continuation-in-part of Ser. No. 958,691, Nov. 8, 1978, abandoned.

[30] Foreign Application Priority Data

Sep. 11, 1977 [MX] Mexico .................................. 171256

[51] Int. Cl.³ ...................... H01H 35/18; G01F 23/12
[52] U.S. Cl. .................................... 200/84 C; 73/313; 340/624
[58] Field of Search ................. 340/623, 624; 73/308, 73/313; 200/81.9 M, 83 L, 84 C, 150 B

[56] References Cited

U.S. PATENT DOCUMENTS

| | | | |
|---|---|---|---|
| 2,457,939 | 1/1949 | Stroup | 200/150 B |
| 3,200,645 | 8/1965 | Levins | 73/313 |
| 3,437,771 | 4/1969 | Nusbaum | 200/84 C |
| 3,484,774 | 12/1969 | Borgnakke | 340/624 X |
| 3,646,293 | 2/1977 | Howard | 200/84 C |
| 3,976,963 | 8/1976 | Kübler | 73/313 X |
| 4,056,979 | 11/1977 | Bongort et al. | 73/313 |

FOREIGN PATENT DOCUMENTS

| | | | |
|---|---|---|---|
| 1036717 | 8/1958 | Fed. Rep. of Germany | 73/313 |
| 1469576 | 1/1967 | France | 73/313 |
| 1560345 | 2/1969 | France | 73/313 |
| 614332 | 7/1978 | U.S.S.R. | 73/313 |

Primary Examiner—John W. Caldwell, Sr.
Assistant Examiner—Daniel Myer
Attorney, Agent, or Firm—Finnegan, Henderson, Farabow, Garrett & Dunner

[57] ABSTRACT

A liquid level registering device in a tank of liquid includes a non-magnetic tube surrounded by a movable magnetic float. The tube contains a dielectric oil and reed switches which are fixed at different levels. When the level of liquid carries the magnetic float to the same vertical level as a particular switch, that switch changes its state.

5 Claims, 3 Drawing Figures

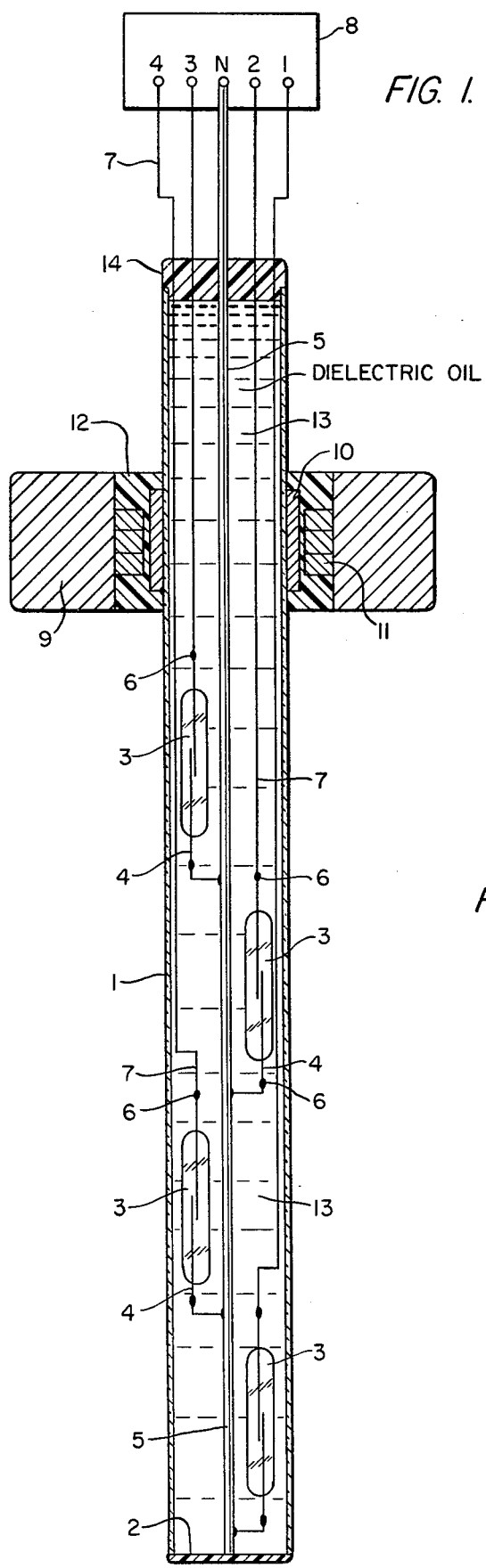
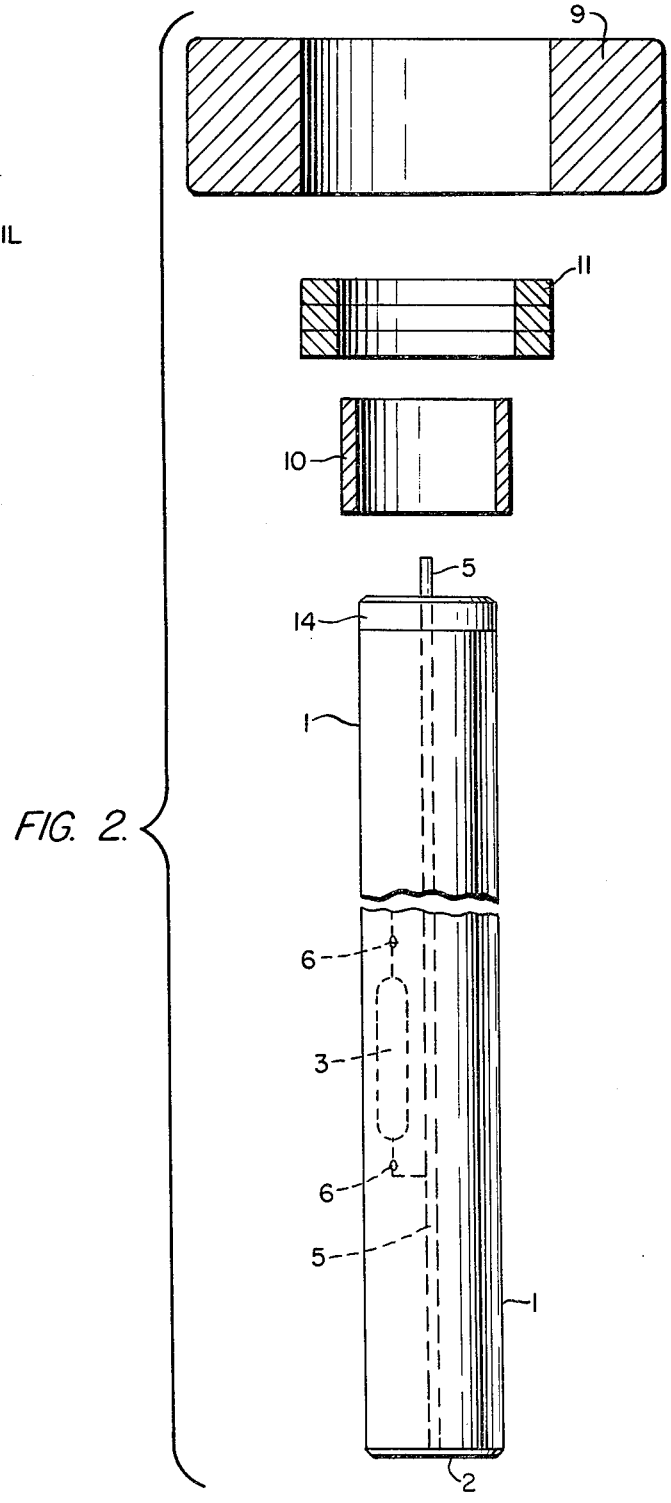
FIG. 1.
FIG. 2.

EXPLOSION-PROOF DEVICE FOR MEASURING LIQUID LEVELS

RELATED APPLICATIONS

The present application is a continuation-in-part of U.S. Ser. No. 958,691, filed Nov. 8, 1978, and now abandoned.

FIELD OF THE INVENTION

The present invention refers to improvements in devices for measuring liquid levels in containers and tanks, particularly while those tanks are filling or draining.

BACKGROUND OF THE INVENTION

Over the years, industry has been unable to rely on an economical, maintenance-free and accurate system to measure the level of liquids in tanks. Level measurement systems are used to operate alarm gauges which indicate maximum and minimum liquid levels and control pumps, lights and signals.

Most level measurement systems use some type of floating device. The classical floating device uses a control system responsive only to the maximum tank filling level. Alternatively, there are also very sophisticated electronic level measurement systems in which reed switches in contact with the liquid ensure measurements which vary according to the salinity of the liquid.

SUMMARY OF THE INVENTION

The present invention provides an economical and reliable device to measure the levels of any kind of liquids, and to use those measurements to operate, for example, alarms indicating the maximum and minimum liquid levels, pumps or light signaling-apparatus.

It is an object of this invention to provide a reliable device to measure the levels of liquid in a tank.

It is another object of this invention to provide a device to measure the levels of any type of liquid in a tank and to perform that measurement safely.

To achieve the objects and in accordance with the purpose of the invention, as embodied and as broadly described herein, the device for registering the level of a liquid in a tank of this invention comprises a sealed non-magnetic tube fixed substantially vertically in the tank; at least one non-magnetically biased reed switch situated at a predetermined level in the non-magnetic tube, the at least one switch being sealed in a glass vial filled with inert gas and having two terminals extending through the glass vial; a conducting pipe connected to one terminal of the at least one reed switch and extending through the top of the non-magnetic tube; a wire connected to the second terminal of the at least one reed switch and extending through the top of the non-magnetic tube; floating means surrounding the non-magnetic tube and moving in a substantially vertical direction along the non-magnetic tube generally following the level of the liquid in the tank; a magnet in the floating means for activating the at least one reed switch when the floating means is at approximately the same vertical level as the switch; and a dielectric oil inside the non-magnetic tube for suppressing the formation of sparks from the at least one reed switch when it is activated.

The improvement offered by this invention is that it can be used in tanks containing inflammable liquids, such as oil, light oils, gasoline, and aircraft fuel, and it can also be used in tanks storing corrosive acids, such as alkali. In general, the level of measuring device of this invention can be used to store any kind of liquid with a density which allows the suspension of an adequate floating device.

The device of this invention is reliable and durable since the reed switches in the device are designed to work over a long period of time. When activated with proper electric current, they can operate 500,000,000 cycles without being damaged.

This invention is also very safe. The device of this invention is practically "explosion proof" since it is triply protected.

First, the reed switches in the device are located in a vial filled with an inert gas which impedes the formation of a spark during switching.

Second, a non-magnetic tube prevents contact between the reed switches and the liquid to be measured.

Finally, the non-magnetic tube is filled with a dielectric oil which prevents formation of a possible spark and presents an additional humidity-proof insulation.

The accompanying drawings, which are incorporated in and which constitute a part of this specification, illustrate one embodiment of the invention and, together with the description, serve to explain the principles of the invention.

BRIEF DESCRIPTION OF THE DRAWINGS

FIG. 1 is a drawing of the liquid-level measurement device of this invention;

FIG. 2 is an exploded illustration of some of the elements of the device in FIG. 1.

DESCRIPTION OF THE PREFERRED EMBODIMENT

Figure 3:
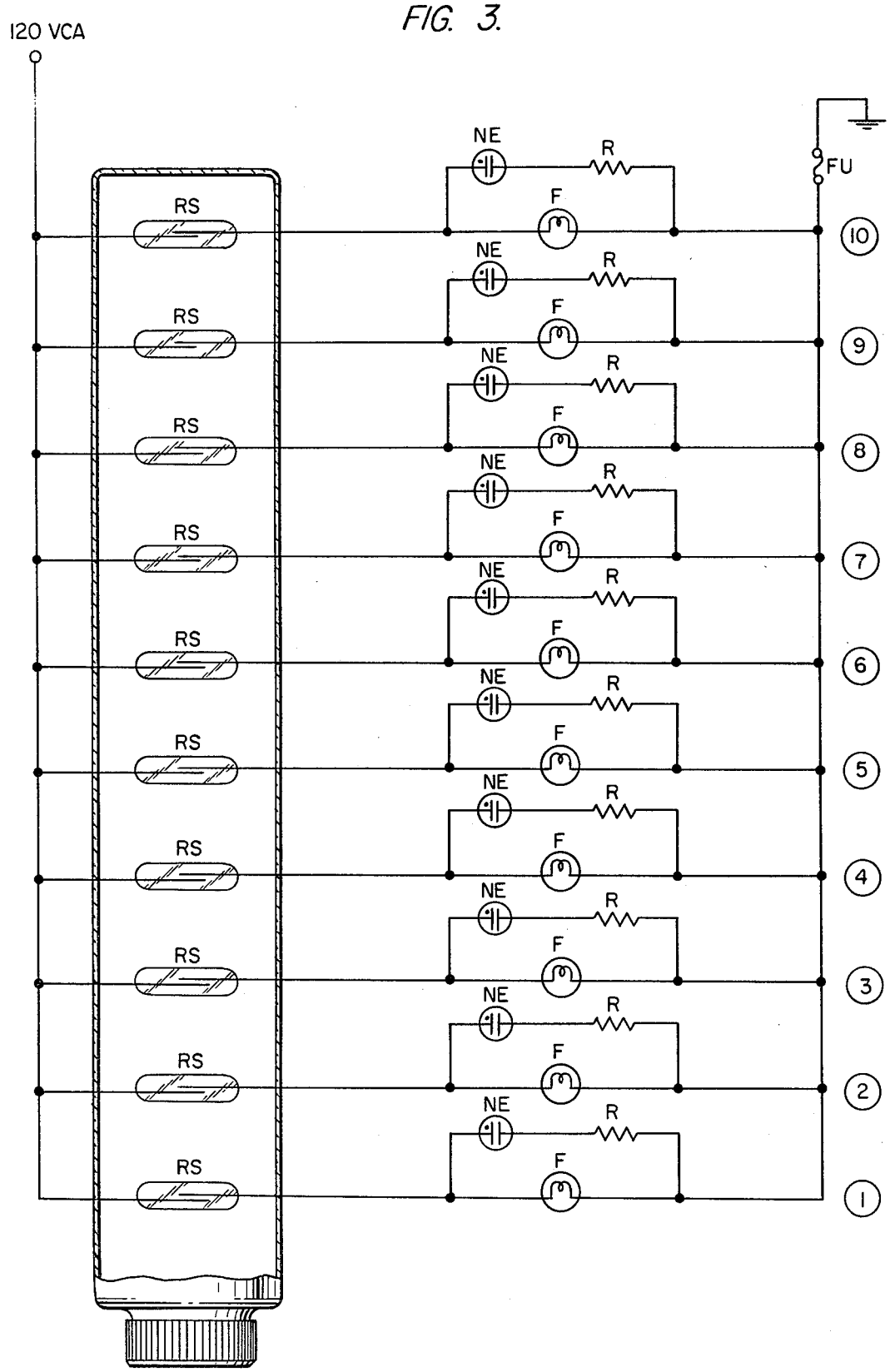
FIG. 3 is a circuit diagram showing the connection of several level-indicating relay switches in the device of this invention.

FIG. 1 shows an embodiment of the present invention for measuring the level of a liquid in a container. Tube 1 is immersed in the liquid held by the container. The tube is made of a non-magnetic material which is chemically inert with respect to the liquid in the container. Tube 1 is sealed at its lower end 2.

Each reed switch 3 inside tube 1 is soldered at terminal 4 to a common conducting pipe 5 preferably made of rigid copper. The other terminals 6 of reed switches 3 are each soldered to a different one of wires 7 which extend through top plug 4 to connections in terminal block 8. The terminals in block 8 are numbered 1–4.

The vertical spacing between switches 3 varies according to the levels desired to be detected.

Reed switches 3 are each sealed in a glass vial filled with an inert gas so that sparks from the reed switch contacts do not ignite the liquid in the container. The gas impedes the formation and transmission of sparks.

In accordance with the invention, the liquid level registering device of this invention comprises floating means surrounding the non-magnetic tube. The floating means moves in a vertical direction along the length of the tube and generally follows the level of the liquid in the tank. In the embodiment of the invention in FIGS. 1 and 2, the floating means includes magnetic floating device 9.

Magnetic floating device 9 comprises a hermetically-sealed, tube-shaped ring. The shape of floating device 9, however, is not critical. Floating device 9 is constructed from material which cannot become corroded by the liquid surrounding device 9 in the container. The specific material may vary according to the particular application of the device, but one of ordinary skill will know which materials are appropriate for measuring each liquid.

Device 9 also contains steel tube 10 surrounded by several tubular magnets 11 (alnico or ferrite type). Tube 10 is concentrically fitted into the hollow of the floating device 9 and is sealed with resin 12 for protection and for fixing it to the floating device 9. Any sealing material used will obviously also have to be chemically-resistant to the liquid to be measured.

As FIG. 1 shows, steel tube 10 is the part of floating device 9 which is closest to the surface of non-magnetic tube 1. Steel tube 10 is not fixed to tube 1, but instead slides freely along non-magnetic tube 1 as floating device 9 moves up and down.

Non-magnetic tube 1 is filled with dielectric oil 13 which is sealed in tube 1 by plug 14 on the upper part of non-magnetic tube 1. Dielectric oil 13 not only prevents the escape of sparks from relays 3 into the liquid to be measured, it also provides an additional insulation for the switches 3 in tube 1 by eliminating the conduction paths provided by the humidity in the air that would otherwise occupy tube 1.

Magnetic floating device 9 moves up and down tube 1 as the level of the liquid in a tank containing tube 1 moves up and down. Due to the magnetic field generated by the magnets 11 in floating device 9, when floating device 9 is at the same level as a particular reed switch 3, the contacts of the reed switch change state (i.e., a normally closed switch opens and a normally open switch closes). This change of state would be detected by an electric circuit connected to the switch which could include servo-control devices or fail-safe circuits.

The exemplary embodiment in FIG. 1 shows four reed switches 3 at four different levels. The device of this invention shown in FIG. 1 is thus capable of energizing either detectors or control circuits for four different levels of liquid in the container.

FIG. 3 is a diagram of the electric circuit of the device of this invention used in an industrial water pit. The tube has 10 equally-spaced relays at points of indication which are 7.5 centimeters from each other. A control system is connected to these relays to monitor the maximum and minimum levels in the pit and to activate alarms, pumps, and auxiliary systems depending upon the level of the liquid in the water pit.

In FIG. 3, (RS) stands for reed switch, (NE) for neon light, (R) for a resistance of 58 k OHMS, (F) for a light bulb (6 watts/120 volts) and (FU) for a 1 amp/250 volt fuse.

The point No. 10 corresponds to the maximum alarm level, No. 8 to the level where the pumps switch off, No. 3 to the level where the pumps switch on and No. 1 to the minimum alarm level. The alarm lights at points 10 and 1 would turn on in case the automatic pumps failed to perform and the water pit level climbed out of limits. The relays at the intermediary points can be used to energize other control circuits whose function need not be discussed here.

The number of reed switches used for each device embodying this invention would vary according to the needs of the control system.

The device of this invention is extremely reliable since it has a minimum of moving parts and its operation is streamlined to avoid unnecessary elements. In addition to reliability, the system is safe from explosion because the reed switches are triply protected from contact with the liquid in the tank. This protection includes the non-magnetic tube, the dielectric oil in the tube, and the sealed vials filled with inert gas which hold the switches.

It will be apparent to those skilled in the art that various modifications and variations can be made in the liquid level registering device of this invention and in the construction of the non-magnetic tube without departing from the scope and spirit of the invention. It is intended that the present invention cover the modification and variations of this invention provided they come within the scope of the appended claims and their equivalents.

What is claimed is:

1. A device for registering the level of a liquid in a tank comprising:
    (a) a sealed non-magnetic tube fixed substantially vertically in said tank; said non-magnetic tube being sealed at its top and bottom ends;
    (b) at least one non-magnetically biased reed switch situated at a predetermined level in said non-magnetic tube, said at least one switch being sealed in a glass vial filled with inert gas and having two terminals extending through said glass vial;
    (c) a conducting pipe connected to one terminal of said at least one reed switch and extending through said top of said non-magnetic tube;
    (d) a wire connected to the other terminal of said at least one switch and extending through said top of said non-magnetic tube;
    (e) floating means surrounding said non-magnetic tube, said floating means moving in a substantially vertical direction along said non-magnetic tube generally following the level of said liquid in said tank;
    (f) a magnet in said floating means for activating said at least one reed switch when said floating means is at approximately the same vertical level as said switch; and
    (g) a dielectric oil inside said non-magnetic tube for suppressing the formation of sparks from said at least one reed switch when it is activated.

2. The registering device in claim 1 wherein said floating means includes a hermetically-sealed, tube-shaped ring constructed of a material which cannot be corroded by said liquid in said tank.

3. The registering device in claim 2 wherein said floating means further includes a steel tube concentrically fitted into said floating means to slide along the surface of said non-magnetic tube when said floating means moves in a vertical direction.

4. The measuring device in claim 3 further including a terminal block to which said conducting pipe and said wire from said at least one reed switch are connected.

5. The measuring device in claim 1 wherein said conducting pipe is a common conducting pipe and further including a plurality of non-magnetically biased reed switches, each of said switches having two terminals, wherein one of the terminals of each of said switches is connected to said common conducting pipe and the other terminal of each of said switches is connected to a different wire extending through said top of said tube.

* * * * *